Patented Feb. 20, 1934

1,948,004

UNITED STATES PATENT OFFICE 1,948,004

PROCESS FOR THE PRODUCTION OF SULPHATE OF ALUMINA

Robert S. Perry, Cave Spring, Ga., assignor to Paper Makers Chemical Corporation, Kalamazoo, Mich., a corporation of Delaware No Drawing. Application March 18, 1930
Serial No. 436,895

15 Claims. (Cl. 23—123)

My invention relates to the production of alum and refers particularly to those steps of the process of production relating to the grinding of the raw materal and its subsequent sulphation.

Commercial sulphate of aluminum or sulphate of alumina which is known also as alum, as usually used and desired by industries is not alone the neutral salt in which the alumina and sulphuric acid are present in their respective chemical equivalent, but there is usually present a quantity of alumina over and above such equivalent dissolved, or dispersed, in the sulphate of alumina to the extent of from 8 per cent to 18 percent of the alumina combined with sulphuric acid. Such product is referred to as basic and the total strength of the usual industrial product is from about 17 per cent to 18 per cent of total alumina.

The general practice in the production of alum is to grind dry bauxite ore, digest the ground ore with sulphuric acid and separate the produced sulphate of alumina solution from the unconverted ore and other undesirable insoluble material present.

Experience has shown that while this so-called sulphating of the bauxite may be readily accomplished, there are many physical conditions necessary for the commercial production of the product, and that a successful process is dependent upon the production of the product in each of its intermediate steps under certain physical conditions.

The present generally employed process based upon the present known art of these physical conditions is to dry bauxite ore, grind this dry bauxite ore, introduce the dry ground ore into a lead lined receptacle, known as a sulphator, and treat the ore with sulphuric acid 40° Bé. at a temperature which will produce the necessary reaction, large quantities of water are then added, the mass heated, the resultant mixture allowed to settle, the liquid removed from he insoluble matter and the alum obtained from the liquid by evaporation by means of heat application and subsequent solidification through cooling.

The use of sulphuric acid of approximately 40° Bé. is based upon the observations that sulphuric acid of either greater or lesser strength than about 40° Bé. is not conducive to efficient sulphation and to the best mechanical manipulation of sulphation.

This present employed process has many disadvantages among which may be mentioned the expense incident to the drying of the bauxite ore, the inconvenience and loss of bauxite dust unless comparatively expensive dust collecting apparatus be employed, the loss of reaction heat incident to the use of acid that has been diluted from 60° Bé. acid to 40° Bé. acid for sulphating processes, the incomplete sulphation due to the fact that the action of the acid is limited to the surface area of the hard ore particles and the length of time necessary for the sulphating operation and the consequent increase cost for heating the mixture during the operation.

The process of my invention overcomes the above mentioned, and other, disadvantageous features of the present known processes, and presents a most valuable advance in the commercial production of alum.

My process consists broadly in grinding bauxite ore in the presence of water to produce a bauxite slurry and then adding to this slurry sulphuric acid having a strength greater than 40° Bé. Without limiting myself to the particular properties mentioned, I prefer to use a quantity of water in the grinding process which is approximately equal to the amount of water necessary in reducing 60° Bé. sulphuric acid to 40° Bé. estimated upon the amount of 40° Bé. acid which has heretofore been employed in the sulphating process, and I prefer for purposes of effective re-action and economic operation that the bauxite ore and water be ground together so that at least three-quarters of the ore particles will pass through a 200 mesh screen.

I give the following as an example of the practical adaptation of the process of my invention:—

Into a pebble mill of about 6 feet diameter and of about 9 feet length and with about 5000 pounds of flint pebbles contained in said mill, is charged about 4000 pounds of about 50% strength (available aluminum) bauxite ore all of which will pass thru less than a two inch diameter ring.

About 4000 pounds of water are then added into the mill. The pebble mill is then revolved at about 20 revolutions per minute for about 1½ hours when operating on so called soft bauxite and for a longer period up to 5 hours on harder bauxite ore.

The mill is then stopped, its port opened and the resultant slurry is dumped downward from the mill and either stored for future use or pumped directly through convenient pipe system to the sulphator tank where 60° Baumé sulphuric acid is added in such poundage as will furnish sufficient acid to sulphate from about 85% to 95% of the available alumina in the bauxite, depending upon the amount of basicity or nonsulphated alumina that may be desired in the sulphate of alumina product.

The resulting mixture of bauxite slurry and acid is then retained in the sulphator and preferably with continuous agitation for a period of about 20 hours and maintained at a temperature of about 103° centigrade; steam heat through a lead steam coil at about 60 pounds pressure being supplied to the mix in event that the heat should not be sufficient that is generated from the mixture of the 60° Baumé sulphuric acid with the water of the bauxite slurry together with the heat that is generated from the conversion of hydrate of alumina into sulphate of alumina.

The resultant product of raw alum liquor is then manipulated by any of the desired processes of the previous art to produce the final product of commercial sulphate of alumna.

The quantity of sulphuric acid will naturally depend upon the character of ore employed, and I have further found that if the amount of water employed in the grinding process be somewhat greater than that required to reduce the amount of 60° Bé. acid to a 40° Bé. acid, the use of steam at increased pressure, as for instance 60 pounds pressure, will overcome any consequent inertness of the reaction between the bauxite slurry and the acid.

Another important advantage incident to the process of my invention is that the slurry of ground ore and water is in such a physical condition that the ore will remain suspended therein for a period of time very much greater than the time of suspension resulting from the dry grinding process and the subsequent admixture of the dry ground ore with the diluted acid, or the diluting water, in the present known processes. This physical condition incident to my process has great values over the present employed processes in that I can store the slurry for a considerable length of time before sulphating it, if desired.

A consideration of my process as above described shows its many advantages over the present employed dry grinding processes, among which the following may be mentioned:—

The bauxite ore does not need to be previously dried; the difficulties, loss and expense incident to ore dust are eliminated; the slurry may be retained for a considerable length of time before sulphating; the reaction heat incident to the dilution of the strong sulphuric acid is not lost but is applied directly to the sulphating operation; an increased sulphating reaction resulting in a greater conversion of the ore and consequent reduced expense incident to the general process; a reduction in the time necessary for the sulphating operation, due, at least in part, to the reaction at the wet surfaces of the bauxite particles and within these particles; a reduction in the heat necessary and increased yields.

The process of my invention, therefore, possesses many manufacturing and economic features not found in the present known art of alum production and is a great advance in the production of that article of large commercial consumption.

I do not limit myself to the particular quantities, strengths and amount of materials; nor to the particular times and temperatures, nor to the particular steps of procedure as particularly stated and explained, as these are given simply as a means for clearly explaining the process of my invention.

What I claim is:—

1. In a process for the production of sulphate of alumina, the steps which consist in grinding bauxite ore in the presence of water, thereafter treating said mixture with sulphuric acid and heating the mixture thus formed at atmospheric pressure.

2. In a process for the production of sulphate of alumina, the steps which consist in grinding bauxite ore in the presence of water, thereafter adding sulphuric acid of greater strength than approximately 40° Bé. thereto and heating the mixture thus formed at atmospheric pressure.

3. In a process for the production of sulphate of alumina, the steps which consist in grinding bauxite ore in the presence of water, thereafter adding sulphuric acid of greater strength than approximately 40° Bé. thereto, the amount of water added to said grinding process being that which would be necessary to reduce the sulphuric acid so used to approximately 40° Bé. and heating the mixture thus formed at atmospheric pressure.

4. In a process for the production of sulphate of alumina, the steps which consist in grinding bauxite ore in the presence of water, thereafter adding sulphuric acid of approximately 60° Bé. thereto and heating the mixture thus formed at atmospheric pressure.

5. In a process for the production of sulphate of alumina, the steps which consist in grinding bauxite ore in the presence of water, thereafter adding sulphuric acid of approximately 60° Bé., thereto, the amount of water added to said grinding process being that which would be necessary to reduce the sulphuric acid so employed to approximately 40° Bé. and heating the mixture thus formed at atmospheric pressure.

6. In a process for the production of sulphate of alumina, the steps which consist in grinding bauxite ore in the presence of water, producing a slurry approximately three-quarters of which will pass through a 200 mesh, treating said mixture with sulphuric acid and heating the mixture thus formed at atmospheric pressure.

7. In a process for the production of sulphate of alumina, the steps which consist in grinding bauxite ore in the presence of water producing a slurry approximately three-quarters of which will pass through a 200 mesh, adding sulphuric acid of greater strength than approximately 40° Bé. thereto and heating the mixture thus formed at atmospheric pressure.

8. In a process for the production of sulphate of alumina, the steps which consist in grinding bauxite ore in the presence of water producing a slurry approximately three-quarters of which will pass through a 200 mesh, adding sulphuric acid of greater strength than approximately 40° Bé. thereto, the amount of water added to said grinding process being that which would be necessary to reduce the sulphuric acid so used to approximately 40° Bé. and heating the mixture thus formed at atmospheric pressure.

9. In a process for the production of sulphate of alumina, the steps which consist in grinding bauxite ore in the presence of water, producing a slurry approximately three-quarters of which will pass through a 200 mesh, adding sulphuric acid of approximately 60° Bé. thereto and heating the mixture thus formed at atmospheric pressure.

10. In a process for the production of sulphate of alumina, the steps which consist in grinding bauxite ore in the presence of water, producing a slurry approximately three-quarters of which will pass through a 200 mesh, adding sulphuric acid of approximately 60° Bé. thereto, the amount of water added to said grinding process being that which would be necessary to reduce the sulphuric acid so employed to approximately 40° Bé. and heating the mixture thus formed at atmospheric pressure.

11. A method of treating aluminum-bearing earths which consists in wet grinding the same and then reacting the resulting slurry with sulphuric acid.

12. A method of treating aluminum-bearing earths which consists in wet grinding the same, and then reacting the resulting slurry with sulphuric acid, the specific quantity of the sulphuric acid as diluted by the water contained in the slurry being between 35° and 40° Bé.

13. A method of treating aluminum-bearing earths which consists in wet grinding the same with water in the proportion of 1 to 1 on the basis of dry earth, and then reacting the resulting slurry with sulphuric acid.

14. A method of treating aluminum-bearing earths which consists in wet grinding the same for from 2½ to 3 hours and then reacting the resulting slurry with sulphuric acid.

15. A method of treating aluminum-bearing earths which consists in wet grinding the same with an additional amount of water to produce a 1 to 1 dilution, adding to the resulting slurry sulphuric acid and water, which with the water already contained in the slurry, will produce the equivalent of an acid solution of between 35° and 40° Bé., and digesting the mixture.

ROBERT S. PERRY.